United States Patent [19]
Mehaffy et al.

[11] Patent Number: 6,117,945
[45] Date of Patent: Sep. 12, 2000

[54] LOW APPLICATION TEMPERATURE HOT MELT ADHESIVE

[75] Inventors: Justin A. Mehaffy, Flemington; Ingrid Cole, Somerville, both of N.J.

[73] Assignee: National Starch and Chemical Investment Holding Corporation, Wilmington, Del.

[21] Appl. No.: 09/018,634

[22] Filed: Feb. 4, 1998

[51] Int. Cl.⁷ ..................................................... C08K 5/07
[52] U.S. Cl. ........................................... 525/159; 524/487
[58] Field of Search ............................... 525/159; 524/487

[56] References Cited

U.S. PATENT DOCUMENTS

| | | | |
|---|---|---|---|
| 3,932,332 | 1/1976 | Douglas et al. | 260/28.5 A |
| 4,113,801 | 9/1978 | Douglas et al. | 260/876 B |
| 4,358,557 | 11/1982 | Boggs | 524/272 |
| 4,497,936 | 2/1985 | Tancrede et al. | 525/222 |
| 4,497,941 | 2/1985 | Aliani et al. | 526/331 |
| 5,373,049 | 12/1994 | Ornstern et al. | 524/487 |

FOREIGN PATENT DOCUMENTS

| | | | |
|---|---|---|---|
| 0 776 955 A1 | 6/1997 | European Pat. Off. | C09J 123/08 |
| 172 893 | 1/1985 | United Kingdom | C08F 212/12 |

OTHER PUBLICATIONS

Kristalex® 3100, Highly Stable, Water–Clear Thermoplastic Resin; Technical Information No. 7159–8; Hercules Incorporated, Wilmington, DE.

*Primary Examiner*—Terressa M. Boykin
*Attorney, Agent, or Firm*—Lydia T. McNally

[57] ABSTRACT

A low application temperature hot met adhesive composition and its use in carton, case or tray formation comprising from ethylene vinyl acetate with greater than 30 weight percent VA and having a melt index of at least 700; a thermoplastic hydrocarbon resin derived from styrene, alpha-methylstyrene, and/or vinyltoluene, and polymers, copolymers and terpolymers thereof; a compatible adhesive promoting tackifier; and wax with a melting point of about 130 to 170 °F.; and optionally comprising ethylene vinyl acetate with less than about 30 weight percent by weight of vinyl acetate and having a melt index of about 400 to 2500.

24 Claims, No Drawings

LOW APPLICATION TEMPERATURE HOT MELT ADHESIVE

BACKGROUND OF THE INVENTION

Hot melt adhesives, 100% solids materials, which are applied to a substrate when molten and cooled to harden the adhesive layer, are widely used for industrial applications.

Most commercially available hot melt adhesives require temperatures of 350° F. or greater to ensure complete melting of all the components and also to achieve a satisfactory application viscosity. The need for such elevated temperatures is not without problems. The high temperatures increase the operators risks with respect both to burns and to inhalation of residual volatiles. In addition, the high temperatures require more energy, placing greater demands on the manufacturing facility.

Adhesive formulations, which can be applied at temperatures below 300° F., can be prepared using low molecular weight components or a high wax content. Although these formulations achieve a low application viscosity, there is a resulting loss of adhesive properties. Therefore to improve adhesion, softer or more amorphous components are added. However, these amorphous components reduce the effective heat resistance, particularly under cantilever stressed bonds subjected to high temperatures for an extended duration.

Accordingly it would be desirable to have an adhesive which has good bond strength with exceptional heat resistance and application viscosity, even if prepared with low molecular weight components for application at low temperatures.

The adhesive compositions of the present invention can be applied at lower temperatures of 200 to 300° F. yet still provide exceptional heat resistance despite using low molecular weight components which would conventionally be thought to produce poor heat and cold resistance.

Accordingly, the adhesives of the present invention find use in case sealing operations. Corrugated cases are often subjected to high stresses and adverse environmental conditions during shipping. The adhesives of the present invention meet the rigorous requirements for this and other applications.

SUMMARY OF THE INVENTION

We have now found hot melt adhesives prepared from a) 5 to 45 weight percent ethylene vinyl acetate with greater than 30 weight percent vinyl acetate and having a melt index of at least 700 dg/min;

b) 10 to 60 weight percent of a thermoplastic hydrocarbon resin derived from styrene, alpha-methylstyrene, and/or vinyltoluene, and polymers, copolymers and terpolymers thereof;

c) 5 to 25 weight percent of a compatible adhesive promoting tackifier;

d) 10 to 40 weight percent wax with a melting point of about 130 to 180° F.; and optionally e) 5 to 25 weight percent ethylene vinyl acetate comprising less than 30 weight percent vinyl acetate with a melt index of at least 400 dg/min, can be applied at lower temperatures of 200 to 300° F. yet still provide exceptional heat resistance. Weight percents are based upon the total weight of the adhesive composition.

DETAILED DESCRIPTION OF THE INVENTION

The present invention is directed to hot melt adhesive compositions which can be applied at temperatures between 200 to 300° F. yet still provide exceptional heat resistance despite using low molecular weight components.

The ethylene vinyl acetate copolymers (EVA) useful herein are those containing at least about 30 weight percent by weight vinyl acetate and having a melt index of at least about 700 dg/min, preferably at least about 1000 dg/min. The preferred copolymers are available from duPont under the designation Elvax EP4150 and comprise approximately 40 weight percent vinyl acetate by weight and have a melt index of about 1000 dg/min. The amount of the copolymer present in the adhesive varies from about 5 to 45 weight percent by weight, preferably about 20 to 40 weight percent by weight.

In addition to the components described above, the adhesive compositions of the present invention may optionally comprise a second EVA copolymer, specifically one containing less than about 30 weight percent by weight of vinyl acetate and having a melt index of about 400 to 2500 dg/min. The preferred copolymers are available from Exxon under the designation ESCORENE and contain approximately 28 weight percent vinyl acetate by weight and have a melt index of about 800 dg/min. The amount of this copolymer present in the adhesive varies from about 5 to 25 weight percent by weight, preferably 10 to 20% by weight.

The hot melt adhesive compositions of the present invention also comprise a thermoplastic hydrocarbon resin having a Ring and Ball softening point below 130° C., preferably below 120° C. Representative resins include those derived from styrene, alpha-methylstyrene, and/or vinyltoluene, and polymers, copolymers and terpolymers of styrene, alpha-methylstyrene and/or vinyltoluene. Preferred is KRYSTALEX® 3100, a low molecular weight thermoplastic hydrocarbon polymer derived largely from alpha-methylstyrene which has a Ring and Ball softening point of 97 to 103° C. and is available from Hercules Inc. The thermoplastic hydrocarbon resins are present in the adhesive compositions of the present invention in an amount of 10 to 60 weight percent by weight of the composition, preferably 15 to 35 weight percent.

Compatible adhesive promoting tackifiers useful in the present invention include terpene, terpene phenolic, modified terpene, and combinations thereof. Also included are the hydrogenated derivatives of phenolic modified terpene resins, for example, as the resin product resulting from the condensation, in an acidic medium, of a bicyclic terpene and a phenol. NIREZ 300, a phenolic modified terpene having a Ring and Ball softening point about 112° C. and available from Arizona Chemical Company, is the most preferred modified terpene.

Other compatible adhesive promoting tackifiers useful in the present invention include rosin, rosin derivatives, rosin ester, aliphatic hydrocarbons, aromatic hydrocarbons, aromatically modified aliphatic hydrocarbons and mixtures thereof. Examples of rosin ester tackifiers include both natural and modified rosins such as gum rosin, wood rosin, tall-oil rosin, distilled rosin, hydrogenated rosin, dimerized rosin, polymerized rosin, as well as the glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of hydrogenated rosin, the phenolic-modified pentaerythritol ester of rosin, and combinations thereof. Rosin ester, 100° C., with a 110° aliphatic hydrocarbon is the most preferred rosin ester.

Representative commercial tackifiers include NIREZ V-2040 and NIREZ 300 from Arizona Chemical Company, and DERTOPHENE T 105 from DRT. Other commercially available tackifiers include SYLVATAC 100, ZONATAC and ZONESTER from Arizona Chemical Company, PERMALYN from Hercules, UNITAC Union Camp and NOVARES from Georgia Pacific.

A compatible adhesive tackifier system for use in the present invention is chosen based on a number of factors including the solubility parameter, molecular weight distribution, and basic chemical structure of the tackifier system. These factors, along with others, impact the chemical and physical interaction between the wax, polymer and tackifier blend. The proper selection of components results in a compatible, low application temperature hot melt adhesive prepared using predominately low molecular weight components.

For use herein, it is also important that the tackifying resin have a Ring and Ball softening point less than about 130° C., preferably less than 120° C.

The compatiblizing tackifying resins are utilized in amounts of up to about 25 weight percent, preferably 10 weight percent, by weight of the adhesive composition. The present invention contemplates that the adhesive composition of the present invention comprise one or more of the above adhesive promoting tackifying resins.

Waxes suitable for use in the present invention are paraffin waxes having melting points in the range of about 130 to 160° F., such as, for example, PACEMAKER from Citgo, and R-2540 from Moore and Munger; and low melting point synthetic Fischer-Tropsch waxes having a melting point of less than about 180° C. The most preferred wax is paraffin wax with a melting point of 150° C. The wax component is utilized at levels of greater than about 10 weight percent, preferably about 20 to 40 weight percent, by weight of the adhesive.

The adhesives of the present invention preferably also contain a stabilizer or antioxidant. Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis (2,6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-n-octylthio)ehtyl 3,5-di-tert-butyl-4-hydroxy-benzoate; and sorbitol hexa[3-(3,5-di-tert-butyl-4-hydroxy-phenyl)-propionate].

The performance of these antioxidants may be further enhanced by utilizing, in conjunction therewith, known synergists such as, for example, thiodipropionate esters and phosphites. Distearylthiodipropionate is particularly useful. These stabilizers, if used, are generally present in amounts of about 0.1 to 1.5 weight percent, preferably 0.25 to 1.0 weight percent.

The present invention also contemplates the addition to the adhesive of a polymeric additive selected from the group consisting of ethylene methyl acrylate polymers containing 10 to 28 weight percent by weight methyl acrylate, ethylene acrylic acid copolymers having an acid number of 25 to 150, polyethylene, polypropylene, poly(butene-1-co-ethylene) polymers and low molecular weight and/or low melt index ethylene n-butyl acrylate copolymers. When such additive is present, it is present in amounts up to about 15 weight percent by weight of composition.

Depending on the contemplated end uses of the adhesives, other additives such as plasticizers, pigments and dyestuffs conventionally added to hot melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10 weight percent by weight, into the formulations of the present invention.

A preferred embodiment of the present invention is directed to an adhesive composition comprising:

a) 5 to 45 weight percent ethylene vinyl acetate with greater than 30 weight percent vinyl acetate and having a melt index of at least 700;

b) 10 to 60 weight percent of a thermoplastic hydrocarbon resin derived from styrene, alpha-methylstyrene, and/or vinyltoluene, and polymers, copolymers and terpolymers thereof;

c) 5 to 25 weight percent of a compatible adhesive promoting tackifier selected from the group consisting of terpene, terpene phenolic, modified terpenes, and combinations thereof; and d) 10 to 40 weight percent wax with a melting point of about 130 to 180° F.

In a second preferred embodiment, the adhesive comprises:

a) 5 to 45 weight percent ethylene vinyl acetate with greater than 30 weight percent vinyl acetate and having a melt index of at least 700;

b) 5 to 25 weight percent ethylene vinyl acetate comprising less than 30 weight percent VA with a melt index of at least 400;

c) 10 to 60 weight percent of a thermoplastic hydrocarbon resin derived from styrene, alpha-methylstyrene, and/or vinyltoluene, and polymers, copolymers and terpolymers thereof;

d) 5 to 25 weight percent of a compatible adhesive promoting tackifier selected from the group consisting of rosin, rosin derivatives, rosin esters, aliphatic hydrocarbons, aromatic hydrocarbons, aromatically modified aliphatic hydrocarbons, gum rosin, wood rosin, tall-oil rosin, distilled rosin, hdrogenated rosin, dimerized rosin, polymerized rosin, the glycerol ester of pale wood rosin, the glycerol ester of hydrogenated rosin, the glycerol ester of polymerized rosin, the pentaerythritol ester of hydrogenated rosin, the phenolic-modified pentaerythritol ester of rosin, and combinations thereof; and e) 10 to 40 weight percent wax with a melting point of about 130 to 180° F.

The adhesive compositions of the present invention are prepared by blending the components in the melt at a temperature of about 121° C. until a homogeneous blend is obtained, approximately two hours. Various methods of blending are known in the art and any method that produces a homogeneous blend is satisfactory.

The resulting adhesives are characterized by a viscosity less than about 3000 cps at 135° C. They may be applied at temperatures of 200 to 300° F. to provide superior adhesive bonds even when exposed to a wide variety of temperature conditions. The adhesives possess excellent heat stability as characterized by the 200 hour 250° F. thermal stability test, which shows no signs of char, skinning or gel formation. In fact some formulations show thermal stability up to 400 hours at 250° F. In addition, a bond formed by two pieces of corrugated case substrate held together by a ½" by 2" compressed bead can maintain a cantilever stress load of 2 to 2.5 psi for 24 hours at temperatures at or above 115° F.

As such the adhesives find particular use as case, carton and tray forming and as sealing adhesives, for example, in the packaging of cereal, cracker and beer products. The hot melt adhesives of the present invention are particularly useful for use in the packaging, converting, bookbinding and nonwoven markets, especially for primary case and carton sealing and for use in the cigarette industry.

EXAMPLES

In the following examples, which are provided for illustrative purposes only, all parts are by weight and all temperatures in degrees Celsius unless otherwise noted.

In the examples, all adhesive formulations were prepared in single blade mixer heated to 135° C. by blending the components until homogeneous.

The adhesives were then subjected to various tests simulating the properties needed for successful commercial applications.

Melt viscosities of the hot melt adhesives were determined on a Brookfield Model RVT Thermosel viscometer using a number 27 spindle.

Test specimens for determining elevated temperature peel and shear strengths were prepared as follows: an adhesive bead ½ inch wide was applied at 121° C. to a strip of 50 pound Kraft paper 1 inch wide by 3 inches long across the width of the paper. A second piece of Kraft paper of the same dimensions was immediately placed over the first piece and 200 gram weight placed on top of the composite construction. The compressed adhesive bead width was ½ inch.

Elevated temperature peel and elevated temperature shear were determined by attaching a 100 gram weight to each specimen and placing the specimens in a forced-draft oven. The temperature was raised in 5.5° C. (10° F.) increments from 38° C. the specimens remained at a given temperature for 15 minutes for conditioning. The heating cycle was run until the final bond failed. Each peel and shear specimen was prepared and tested in duplicate. The elevated peel and shear value shown is the average temperature of failure for the two bonds. In some cases, the sample failed as the temperature was being adjusted within the 10° increments and is noted as such.

Adhesion at various temperatures, as noted, was determined by applying a ½ inch wide bead of adhesive widthwise to a 2 inch by 3 inch piece of substrate (as indicated) and immediately bringing a second piece of board into contact. The bond is aged at each temperature for 24 hours. The bonds were separated by hand and a determination made as to the type of failure and the presence or absence of fiber tear (FT) was noted. "Full" as used in the examples herein refers to 95 to 100% fiber tear. "Moderate" refers to 50 to 95% fiber tear. "Slight" refers to 5 to 50% fiber tear; and "No" refers to 0 to 5% fiber tear.

Heat stress was measured by forming a composite construction of adhesive (2×½" compressed) between two pieces of corrugated of specific dimensions. The adhesive bead forming this composite is then placed under approximately 2 pounds of cantilever stress for 24 hours at elevated temperatures. The maximum temperature at which this construction remains in tact for at least 24 hours is then noted.

Cloud Point is determined by heating the adhesive blends to 121° C. and applying a small bead (approximately 1 gram) of the molten adhesive to the bulb of an ASTM thermometer. The temperature at which the molten adhesive clouds over is then noted These measures of cloud point provide an indication of a hot melt's overall compatibility, i.e., the compatibility of the individual ingredients with each other. Products that show cloud points near or at the softening point of the wax used in the formulation reflect an overall compatible product. The cloudiness that develops as the material cools is the result of the developing crystallinity of the waxy component (causing refraction of light passing through the sample). Systems which possess cloud points much greater than the softening point of the wax exhibit a micro separation changing the refraction index of the molten adhesive. Incompatibility is defined as a cloud point of greater than or equal to 250° F. The practical significance of products with high cloud points are as follows:

(1) Poor inherent compatibility with a tendency to phase separation upon prolonged heating and heating and cooling cycling such as is experienced in commercial operations.

(2) Poor flow properties resulting in "stringing" from rapid fire, air or electric actuated nozzle equipment.

EXAMPLE I

The following materials were used to prepare a series of adhesives in accordance with the present invention: ELVAX 4150 is an ethylene vinyl acetate polymer comprising 40% vinyl acetate, and having a melt index 1000, and available from E.I. duPont de Nemours and Co. UL 8705 is an ethylene vinyl acetate polymer comprising 28% vinyl acetate, with a melt index 800, and available from Exxon. KRYSTALEX® 3100 is a low molecular weight thermoplastic hydrocarbon polymer derived largely from alpha-methylstyrene which has a Ring and Ball softening point of 97 to 103° C. and is available from Hercules Inc. The rosin ester is SYLVATAC 4216 which is a pentarerythritol rosin ester with softening point of 100° C. and available from Arizona Chemical Company. WINGTAC EXTRA is a styrenated aliphatic $C_5$ hydrocarbon with softening point of 100° C. and available from Goodyear. NIREZ 300 is a phenolic modified terpene having a Ring and Ball softening point about 112° C. and available from Arizona Chemical Company. The antioxidant chosen was IRGANOX 101 OFF which is available from Ciba-Geigy.

The physical properties discussed above were tested and the results, along with the adhesive formulation, are shown in Table I below:

TABLE I

|  | I | II | III | A | B |
|---|---|---|---|---|---|
| Anti-oxidant | 0.5 | 0.5 | 0.5 | 0.5 | 0.5 |
| Paraffin | 30 | 30 | 30 | 30 | 30 |
| 40/1000 EVA | 22 | 20 | 35 | 35 | 35 |
| 28/800 EVA | 13 | 15 |  |  |  |
| KRYSTALEX ® 3100 | 25 | 25 | 25 | 35 | 25 |
| 100° C. Rosin Ester | 5 | 10 |  |  | 10 |
| 110° C. C5/C9 | 5 |  |  |  |  |
| 125° C. Terpene |  |  | 10 |  |  |
| Phenolic |  |  |  |  |  |

TABLE I-continued

|  | I | II | III | A | B |
|---|---|---|---|---|---|
| Visc 250° F. | 1205 | 1245 | 1435 | 1155 | 1180 |
| Cloud Pt | 220 | 215 | 190 | 170 | 155 |
| Clarity | Clear | Clear | Clear | Clear | Clear |
| Peel | 120 | 125 | 130 | 135 | 135 |
| Shear | 145 | 145 | 140 | 140 | 140 |
| Adhesion to Kraft Corrugated |  |  |  |  |  |
| 22.2° C. | Full | Full | Mod | Slight | No |
| 4.5° C. | Full | Full | Mod | No | No |
| −6.7° C. | Mod | Full | Slight | No | No |
| −17.8° C. | Slight | Mod | Slight | No | No |
| Heat Stress | 125° F. | 120° F. | 115° F. | 125° F. | 120° F. |

Samples I, II and III are adhesives in accordance with the present invention. Each of Samples I, II and III shows good cloud point values, good clarity, desirable heat stress values and good adhesion. Samples A and B are for comparative purposes.

Comparative Sample A was prepared according to Douglas et al., U.S. Pat. No. 3,932,332 which teaches the general use of paraffin or microcrystalline wax in combination with EVA and a copolymer of styrene and a-methyl styrene. Although Sample A has good clarity and low cloud point, this blend shows extremely poor adhesive properties. Rosin ester can often be used to improve adhesive properties, however, as seen in Sample B, the addition of rosin ester to Sample A, does not result in improved adhesive performance, but rather reduces not only adhesive strength but heat resistance.

By contrast it has been found in accordance with the present invention, that all of the components claimed in the amounts recited are critical to obtaining desirable properties. For example, a sample prepared according to Sample II, however not comprising rosin ester is found to be incompatible and to have poor clarity, indicating that the unique combination of the components of the adhesives of the present invention provides unexpected and superior results.

Sample II, which includes a partial substitution of a more crystalline, less flexible EVA in an adhesive prepared according to Sample III, might be expected to have reduced adhesion, however as is shown in Table I, this adjustment significantly improves adhesion, while maintaining the desired clarity at application temperature. When this polymer substitution is made without the presence of a compatibilizing tackifier in accordance with Douglas et al., the cloud point significantly increases to an unacceptable temperature.

Sample I comprising a hydrocarbon tackifier shows results similar to that seen in Sample III.

We claim:

1. An adhesive composition consisting essentially of:
   a) 5 to 45 weight percent ethylene vinyl acetate with greater than about 30 weight percent VA and having a melt index of at least 700;
   b) 10 to 60 weight percent of a thermoplastic hydrocarbon resin derived from styrene, alpha-methylstyrene, and/or vinyltoluene, and polymers, copolymers and terpolymers thereof;
   c) 5 to 25 weight percent of a compatible adhesive promoting tackifier;
   d) 10 to 40 weight percent wax with a melting point of about 130 to 180° F.; and
   e) optionally 5 to 25 weight percent ethylene vinyl acetate comprising less than about 30 weight percent VA with a melt index of at least about 400.

2. An adhesive according to claim 1 wherein the ethylene vinyl acetate copolymer comprises about 40 weight percent vinyl acetate.

3. An adhesive according to claim 1 wherein the optional ethylene vinyl acetate comprises about 28% vinyl acetate.

4. A carton, case or tray formed utilizing a hot melt adhesive composition said adhesive consisting essentially of:
   a) 5 to 45 weight percent ethylene vinyl acetate with greater than about 30 weight percent VA and having a melt index of at least 700;
   b) 10 to 60 weight percent of a thermoplastic hydrocarbon resin derived from styrene, alpha-methylstyrene, and/or vinyltoluene, and polymers, copolymers and terpolymers thereof;
   c) 5 to 25 weight percent of a compatible adhesive promoting tackifier;
   d) 10 to 40 weight percent wax with a melting point of about 130 to 170° F.; and
   e) optionally 5 to 25 weight percent ethylene vinyl acetate comprising less than about 30 weight percent VA with a melt index of at least about 400.

5. The carton, case or tray of claim 4 wherein the ethylene vinyl acetate copolymer in the adhesive comprises about 40 weight percent vinyl acetate.

6. An adhesive composition consisting essentially of:
   a) 5 to 45 weight percent ethylene vinyl acetate with greater than about 30 weight percent VA and having a melt index of at least about 700;
   b) 10 to 60 weight percent of a thermoplastic hydrocarbon resin derived from styrene, alpha-methylstyrene, and/or vinyltoluene, and polymers, copolymers and terpolymers thereof;
   c) 5 to 25 weight percent of a compatible adhesive promoting tackifier selected from the group consisting of terpene, terpene phenolic, modified terpenes, and combinations thereof;
   d) 10 to 40 weight percent wax with a melting point of about 130 to 180° F.;
   e) 0 to 15 weight percent by weight of a polymeric additive selected from the group consisting of ethylene methyl acrylate polymers containing 10 to 28 weight percent by weight methyl acrylate, ethylene acrylic acid copolymers having an acid number of 25 to 150, polyethylene, polypropylene poly(butene-1-coethylene) polymers and low molecular weight and/or low melt index ethylene n-butyl acrylate copolymers; and
   f) optionally 5 to 25 weight percent ethylene vinyl acetate comprising less than about 30 weight percent VA with a melt index of at least about 400.

7. An adhesive according to claim 6 wherein the ethylene vinyl acetate copolymer comprises about 40 weigth percent vinyl acetate.

8. An adhesive according to claim 6 wherein the a thermoplastic hydrocarbon resin is KRYSTALEX® 3100.

9. An adhesive according to claim 6 wherein the wax is paraffin wax or low melting point synthetic wax.

10. A carton, case or tray formed utilizing a hot melt adhesive composition said adhesive consisting essentially of:
   a) 5 to 45 weight percent ethylene vinyl acetate with greater than about 30 weight percent VA and having a melt index of at least about 700;
   b) 10 to 60 weight percent of a thermoplastic hydrocarbon resin derived from styrene, alpha-methylstyrene, and/or vinyltoluene, and polymers, copolymers and terpolymers thereof;

c) 5 to 25 weight percent of a compatible adhesive promoting tackifier selected from the group consisting of terpene, terpene phenolic, modified terpenes and combinations thereof;

d) 10 to 40 weight percent wax with a melting point of about 130 to 170° F.;

e) 0 to 15 weight percent by weight of a polymeric additive selected from the group consisting of ethylene methyl acrylate polymers containing 10 to 28 weight percent by weight methyl acrylate, ethylene acrylic acid copolymers having an acid number of 25 to 150, polyethylene, polypropylene, poly(butene-1-co-ethylene) polymers and low molecular weight and/or low melt index ethylene n-butyl acrylate copolymers: and f) optionally 5 to 25 weight percent ethylene vinyl acetate comprising less than about 30 weight percent VA with a melt index of at least about 400.

11. The carton, case or tray of claim 10 wherein the ethylene vinyl acetate copolymer in the adhesive contains about 40 weight vinyl acetate.

12. The carton, case or tray of claim 10 wherein the thermoplastic hydrocarbon resin is KRYSTALEX® 3100.

13. An adhesive composition consisting essentially of:

a) 5 to 45 weight percent ethylene vinyl acetate with greater than 30 weight percent vinyl acetate and having a melt index of at least about 700;

b) 5 to 25 weight percent ethylene vinyl acetate comprising less than 30 weight percent vinyl acetate with a melt index of at least about 400;

c) 10 to 60 weight percent of a thermoplastic hydrocarbon resin derived from styrene, alpha-methylstyrene, and/or vinyltoluene, and polymers, copolymers and terpolymers thereof;

d) 5 to 25 weight percent of a compatible adhesive promoting tackifier selected from the group consisting of rosin, rosin derivatives, rosin esters, aromatic hydrocarbons, aliphatic hydrocarbons, aromatically modified aliphatic hydrocarbons, gum rosin, wood rosin, tall-oil rosin, distilled rosin, hydrogenated rosin, dimerized rosin, polymerized rosin, the glycerol ester of natural rosins, the glycerol ester of modified rosins, the pentaerythritol esters of natural rosins, the pentaerythritol esters of modified rosins, the glycerol ester of pale wood rosin, the glycerol ester of hydrogenated rosin, the glycerol ester of polymerized rosin, the pentaerythritol ester of hydrogenated rosin, the phenolic-modified pentaerythritol ester of rosin and combinations thereof;

e) 10 to 40 weight percent wax with a melting point of about 130 to 180° F.;

f) optionally 5 to 25 weight percent ethylene vinyl acetate comprising less than about 30 weight percent VA with a melt index of at least about 400.

14. An adhesive according to claim 13 wherein the ethylene vinyl acetate copolymer of (a) comprises about 40 weight percent vinyl acetate.

15. An adhesive according to claim 13 wherein the ethylene vinyl acetate copolymer of (b) comprises about 29 weight percent vinyl acetate.

16. An adhesive according to claim 13 wherein the thermoplastic hydrocarbon resin is KRYSTALEX® 3100.

17. An adhesive according to claim 13 wherein the wax is paraffin wax or low melting point synthetic wax.

18. A carton, case or tray formed utilizing a hot melt adhesive composition said adhesive consisting essentially of:

a) 5 to 45 weight percent ethylene vinyl acetate with greater than 30 weight percent vinyl acetate and having a melt index of at least about 700;

b) 5 to 25 weight percent ethylene vinyl acetate comprising less than 30 weight percent VA with a melt index of at least about 400;

c) 10 to 60 weight percent of a thermoplastic hydrocarbon resin derived from styrene, alpha-methylstyrene, and/or vinyltoluene, and polymers, copolymers and terpolymers thereof;

d) 5 to 25 weight percent of a compatible adhesive promoting tackifier selected from the group consisting of rosin, rosin derivatives, rosin esters, aliphatic hydrocarbons, aromatic hydrocarbons, aromatically modified aliphatic hydrocarbons, gum rosin, wood rosin, tall-oil rosin, distilled rosin, hydrogenated rosin, dimerized rosin, polymerized rosin, the glycerol ester of natural rosins, the glycerol ester of modified rosins, the pentaerythritol esters of natural rosins, the pentaerythritol esters of modified rosins, the glycerol ester of pale wood rosin, the glycerol ester of hydrogenated rosin, the glycerol ester of polymerized rosin, the pentaerythritol ester of hydrogenated rosin, the phenolic-modified pentaerythritol ester of rosin and combinations thereof;

e) 10 to 40 weight percent wax with a melting point of about 130 to 1 80° F.;

f) 0 to 15 weight percent by weight of a polymeric additive selected from the group consisting of ethylene methyl acrylate polymers containing 10 to 28 weight percent by weight methyl acrylate, ethylene acrylic acid copolymers having an acid number of 25 to 150, polyethylene, polypropylene, poly(bute-ne-1-co-ethylene) polymers and low melt index and/or low molecular weight ethylene n-butyl acrylate copolymers; and g) optionally 5 to 25 weight percent ethylene vinyl acetate comprising less than about 30 weight percent VA with a melt index of at least about 400.

19. The carton, case or tray of claim 18 wherein the ethylene vinyl acetate copolymer of (a) in the adhesive comprises about 40 weight percent vinyl acetate.

20. The carton, case or tray of claim 18 wherein the ethylene vinyl acetate copolymer of (b) in the adhesive comprises about 29 weight percent vinyl acetate.

21. The carton, case or tray of claim 18 wherein the thermoplastic hydrocarbon resin is KRYSTALEX® 3100.

22. A carton, case or tray according to claim 18 consisting essentially of:

a) 20 to 25 weight percent ethylene vinyl acetate comprising 40 weight percent Vinyl acetate, Melt index 1000 dg/min;

b) 10 to 15 weight percent ethylene vinyl acetate comprising 28 weight percent Vinyl acetate, Melt index 800 dg/min;

c) 20 to 30 weight percent KRYSTALEX® 3100, 100° C. Ball and Ring softening point;

d) 1 to 10 weight percent rosin ester tackifier, softening point of 100° F.; and e) 20 to 35 weight percent paraffin wax with melting point 150° F.

23. A carton, case or tray according to claim 10 consisting essentially of:
   a) 30 to 40 weight percent ethylene vinyl acetate comprising 40 weight percent Vinyl acetate, Melt index 1000 dg/min;
   b) 20 to 30 weight percent KRYSTALEX® 3100, 100° C. Ball and Ring softening point;
   c) 1 to 15 weight percent terpene phenolic; and
   (d) 20 to 35 weight percent paraffin wax with melting point 150° F.

24. A carton, case or tray according to claim 18 consisting essentially of:
   a) 20 to 25 weight percent ethylene vinyl acetate comprising 40 weight percent Vinyl acetate, Melt index 1000 dg/min;
   b) 10 to 15 weight percent ethylene vinyl acetate comprising 28 weight percent Vinyl acetate, Melt index 800 dg/min;
   c) 20 to 30 weight percent KRYSTALEX® 3100, 100° C. Ball and Ring softening point;
   d) 1 to 10 weight percent rosin ester tackifier, softening point 100° F.;
   e) 1 to 10 weight percent hydrocarbon tackifier, softening point of 110° F.; and
   f) 20 to 35 weight percent paraffin wax with melting point 150° F.

* * * * *